UNITED STATES PATENT OFFICE.

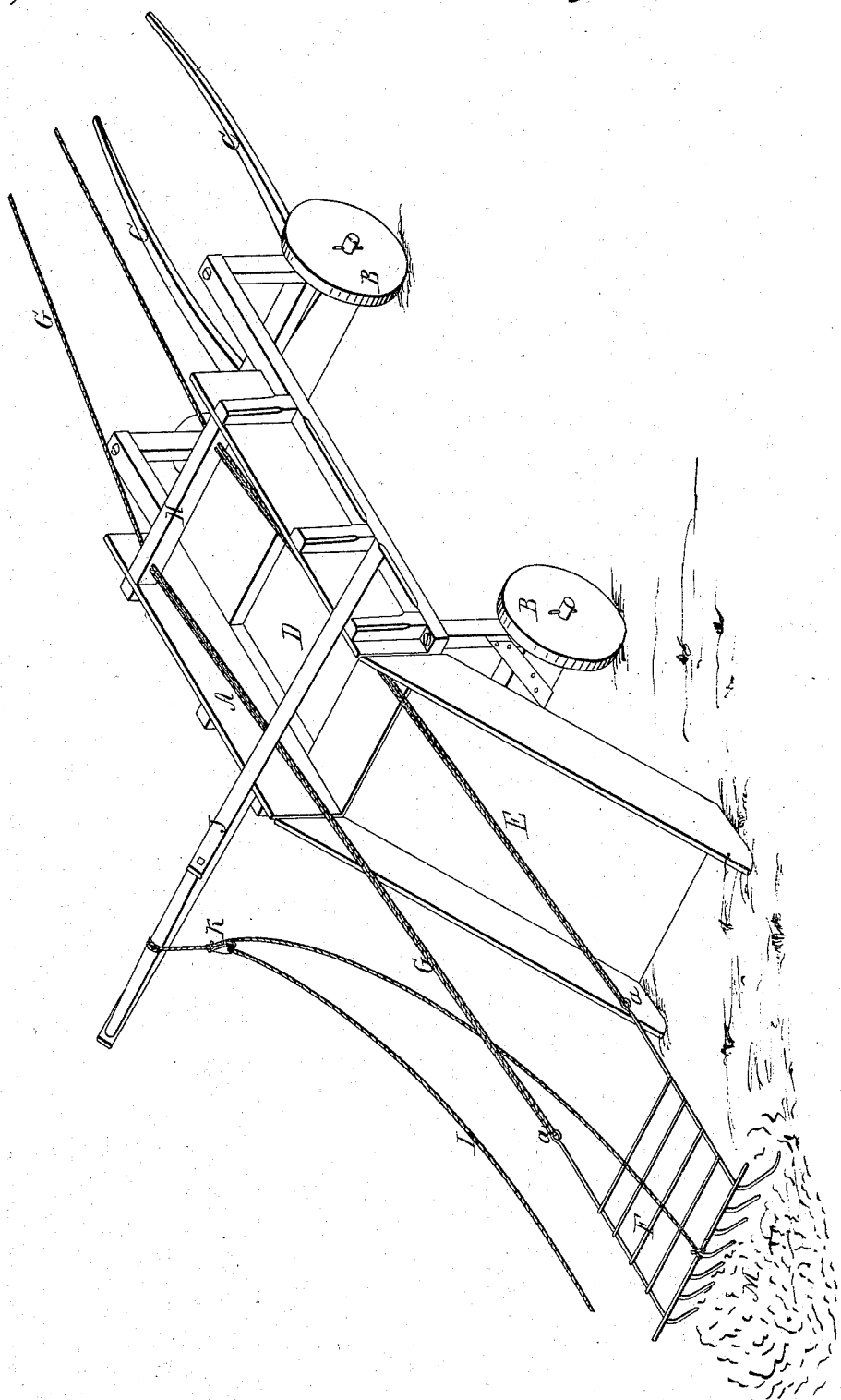

HORATIO G. MARCHANT, OF ANNISQUAM, MASSACHUSETTS.

MANURE AND SAND LOADER.

Specification of Letters Patent No. 10,892, dated May 9, 1854.

*To all whom it may concern:*

Be it known that I, H. G. MARCHANT, of Annisquam, in the county of Essex and State of Massachusetts, have invented a new and useful invention, which I call a "Manure and Sand Loader;" and I hereby declare the following to be a full, clear, and exact description of the same, reference being had to the annexed drawings, making part of this specification.

An instrument for loading manure and sand into carts has long been a desideratum, particularly upon large farms where large quantities of manure are to be moved, at a season when the laboring force is busily occupied. To meet this requisite I have contrived the following invention.

A is a large box or trough-like body of a wagon which is raised sufficiently from the ground to permit a cart to be driven under it, and is mounted upon four wheels B, and furnished with shafts C, for facility of transportation to the different parts of the farm. In the bottom of the box A, is an opening D, and at one end is an inclined trough E.

F is a strong iron rake; G, a rope which is attached to the bar H, thence it passes through the eyes or pulleys *a* on the rake, and returning through the same bar H, is attached to the horse or other animal.

I is an inclined frame from which is suspended the block or pulley K, through which passes the cord L, one end of which is attached to the rake, and the other is held in the hand of the operator. When sand or earth is to be laden into carts, the rake is replaced by a scoop somewhat similar to an earth scraper.

To operate this machine it is brought near to the manure heap M, a horse or other animal of draft is harnessed to the rope G, the cart is driven beneath the box so that its body is immediately beneath the opening D. The operator standing upon the manure heap, swings the rake or scraper by means of the rope L over the position required, the horse is started, and as the rake is carried up the inclined trough E, sufficient manure is carried up to fill the cart beneath. This is then driven away, another cart takes its place, the horse is backed up, the rake swung to its position on the manure heap, and the operation is repeated as before.

It will thus be seen that a great saving of labor and time results, not only of the men but also of the animals employed upon this very necessary and very tedious branch of farm labor.

Having thus described my invention, what I claim as new and desire to secure by Letters Patent, is,

The transportable manure loader consisting essentially of the following elements in combination, viz., the body or box A, the trough E, and the rake G constructed and arranged substantially as described.

In testimony whereof I have hereunto set my signature this eighteenth day of March A. D. one thousand eight hundred and fifty-three.

HORATIO G. MARCHAND.

Witnesses:
SAML. L. YOUNG,
JAMES LANE.